United States Patent
Loveland et al.

(12)

(10) Patent No.: US 6,258,438 B1
(45) Date of Patent: Jul. 10, 2001

(54) VEHICLE SHELF TRIM PANEL WITH INSERT MOLDED SPEAKER GRILLE

(75) Inventors: Earl P. Loveland, Shelby Township; Robert M. Schoen, West Bloomfield; Cody McCloud, Auburn Hills, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/334,803

(22) Filed: Jun. 17, 1999

(51) Int. Cl.[7] ................................ B32B 3/24; H04R 1/02
(52) U.S. Cl. ........................ 428/137; 428/156; 428/131; 428/138; 428/139; 428/140; 296/37.8; 296/37.13; 296/37.16; 296/37.12; 181/141; 181/150; 181/199; 381/386; 381/391; 381/389; 381/395
(58) Field of Search ..................... 428/137, 131, 428/138, 156, 139, 140; 296/37.8, 37.13, 37.16, 37.12; 181/141, 150, 199; 391/386, 391, 389, 395

(56) References Cited

U.S. PATENT DOCUMENTS

| | | | |
|---|---|---|---|
| 4,331,841 | 5/1982 | Castagna | 179/146 E |
| 4,441,577 | 4/1984 | Kurihara | 181/147 |
| 4,451,928 | 5/1984 | Murayama | 381/80 |
| 4,582,162 | 4/1986 | Katsuno | 181/141 |
| 4,811,406 | 3/1989 | Kawachi | 381/186 |
| 4,993,511 | 2/1991 | Hiraki et al. | 181/150 |
| 5,731,551 | 3/1998 | Petrucci | 181/150 |
| 5,754,664 * | 5/1998 | Clark | 381/86 |
| 5,919,544 * | 7/1999 | Terajima | 428/116 |

* cited by examiner

Primary Examiner—William P. Watkins, III
(74) Attorney, Agent, or Firm—Mark P. Calcaterra

(57) ABSTRACT

A substantially acoustically transparent speaker grille is bonded or molded to a rear shelf panel located between the cabin and trunk of a vehicle. The grille is pressed into and laminated between a pair of resin impregnated sheets of fibrous material during a hot press molding operation. The grille and shelf panel is overlaid with a layer of covering fabric so as to present a smooth aesthetic appearance within the vehicle cabin.

12 Claims, 2 Drawing Sheets

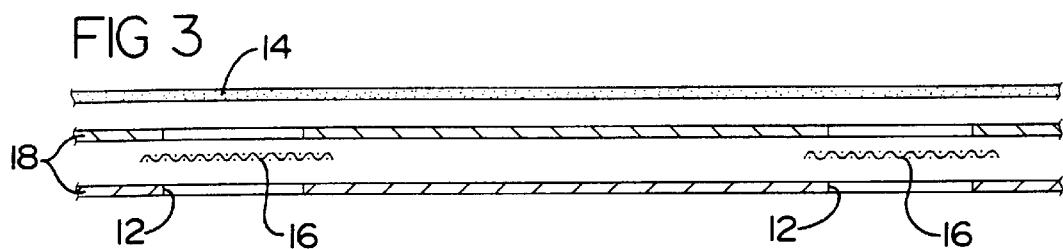
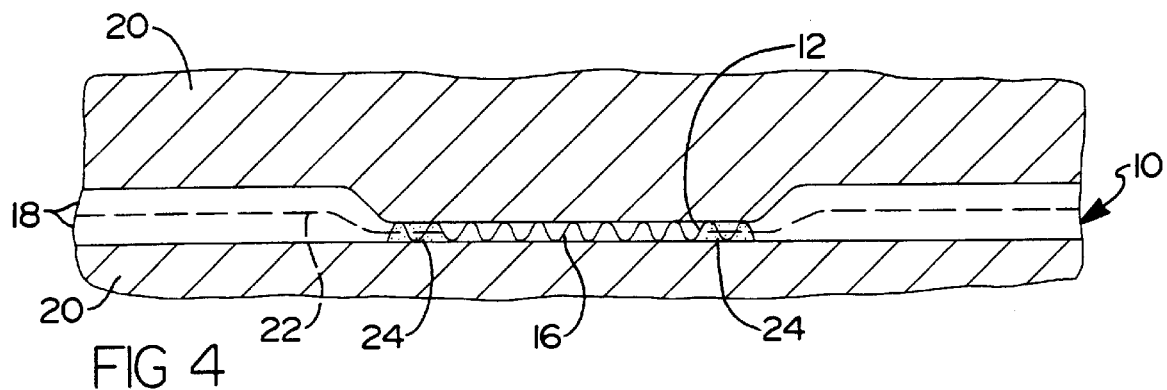
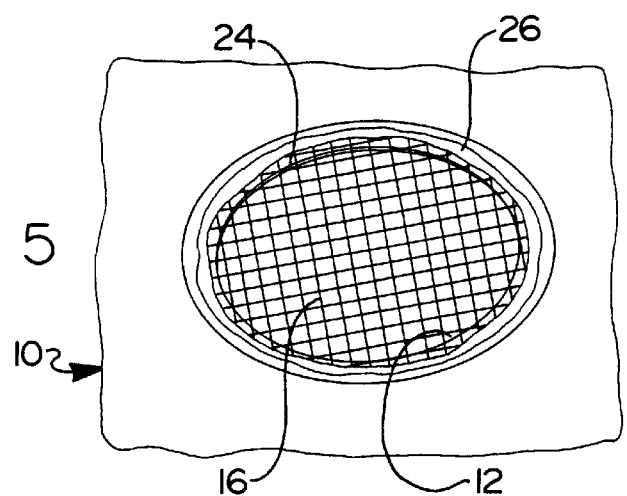
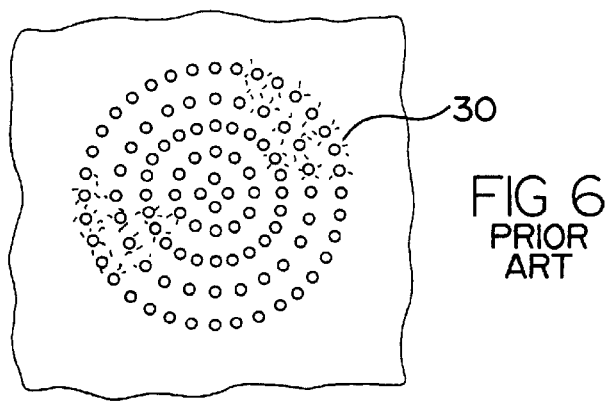

VEHICLE SHELF TRIM PANEL WITH INSERT MOLDED SPEAKER GRILLE

BACKGROUND OF THE INVENTION

1. Field of the Invention

The present invention relates in general to a mounting arrangement for vehicle speakers and in particular to such an arrangement having one or more wire mesh grilles insert molded over a speaker aperture formed in a rear trim panel.

2. Description of Prior Developments

Numerous mounting arrangements have been used to secure a speaker to the rear trim panel located between the trunk and passenger compartment of a vehicle. Trim panels are typically formed of a sound deadening material in order to minimize the transmission of road noise from the trunk or rear portion of a vehicle into the vehicle interior.

This sound absorbing material presents a problem when a speaker is mounted to or adjacent the underside of the trim panel. In some cases the trim panel is perforated in the area of the speaker to allow for the transmission of sound. In other cases, a single aperture is formed through the trim panel and separate mounting hardware including perforated covers and grilles is provided to allow for sound transmission.

Although these prior designs function adequately, the perforated trim panel tends to absorb a significant amount of the speaker's output and the separate mounting hardware can be unsightly as it protrudes above the plane of the trim panel.

What is needed is a rear shelf trim panel which provides a substantially acoustically transparent surface for accommodating a vehicle speaker and which allows for a smooth planar rear shelf surface which is unbroken by any unsightly speaker mounting hardware. Another need exists for such as a trim panel which provides adequate support to a surface covering material such as a fabric or sheet covering applied over the surface of the panel facing the vehicle interior.

SUMMARY OF THE INVENTION

The present invention has been developed to fulfill the needs noted above and therefore has as an object the provision of a rear shelf trim panel for an auto or truck cabin which provides a virtually acoustically transparent speaker grille structure and which supports a shelf covering fabric without any visible grille or mounting hardware.

These and other objects are met by the present invention which is directed to a rear shelf trim panel having one or more wire mesh grilles bonded, molded or insert molded into a fibrous semi-rigid fabric material. The wire grille, which can take the form of a standard metal screen have ½ inch openings, is virtually acoustically transparent. No sound absorbing panel material is present between the speaker and the vehicle cabin. In accordance with the invention, the speaker or speakers are not mounted to the trim panel, but rather are mounted to a metal shelf on the vehicle body, which supports and underlies the trim panel. The bonded or insert molded grilles are aligned directly over and slightly separated from the speakers.

BRIEF DESCRIPTION OF THE DRAWINGS

In the drawings:

FIG. 3 is a schematic exploded view of the trim panel components of FIG. 1 before molding;

FIG. 4 is a view of the trim panel components of FIG. 3 being molded together;

FIG. 5 is a fragmental view of another embodiment of the invention showing a wire grille bonded to the underside of a trim panel with a bead of adhesive glue; and FIG. 6 is a fragmental view of a speaker grille formed by perforating a fibrous trim panel according to the prior art.

In the various figures of the drawings, like reference characters designate like or similar parts.

DETAILED DESCRIPTION OF THE PREFERRED EMBODIMENTS

The present invention will now be described in conjunction with the drawings, beginning with FIG. 1, 2A, and 2B which show a substantially planar rear shelf trim panel 10 constructed in accordance with the invention. Panel 10 is typically located between the rear seat and rear window of a vehicle and extends generally horizontally over the rear trunk compartment.

At least one and typically two or more speaker apertures 12 are formed in a planar portion of the panel 10 to allow for the passage of speaker sound. As seen in FIGS. 2A, 2B and 3, an open-weave fibrous or flocked cover material 14 is adhesively bonded to the upper surface of the trim panel 10 to provide a continuous smooth surface over the panel and speaker 15. Cover material 14 efficiently passes sound waves yet provides an attractive surface on the interior of a vehicle.

Figure 1:
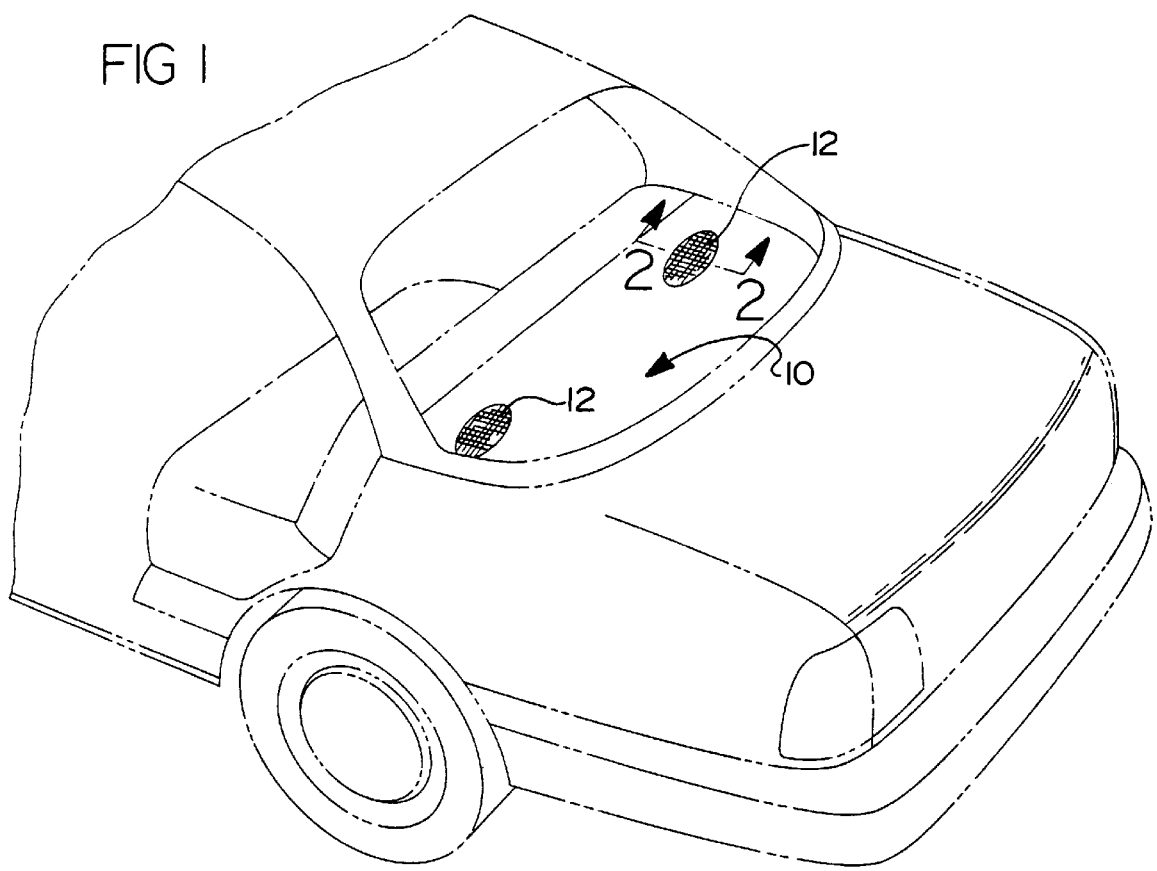
FIG. 1 is a perspective view of a rear shelf trim panel having insert molded speaker grilles constructed in accordance with the invention.
Figure 2A:
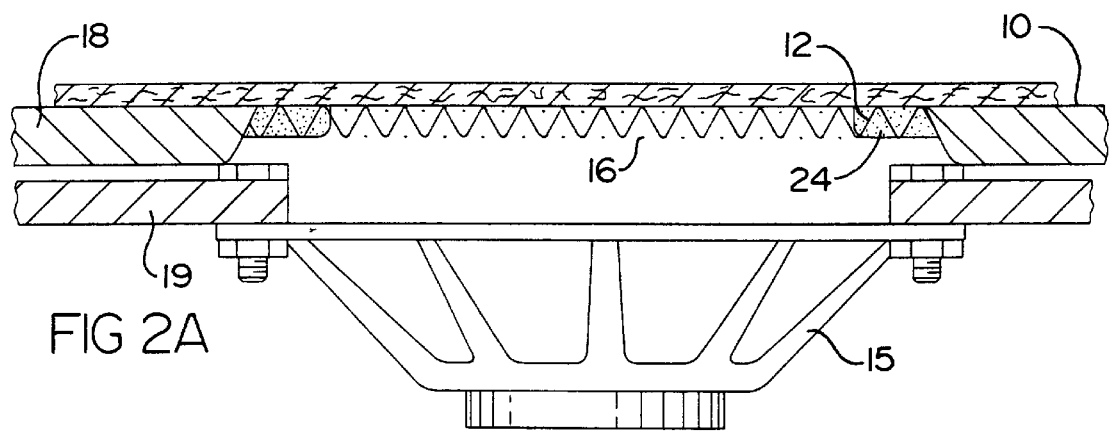
FIG. 2A is a view in section taken through section line 2—2 of FIG. 1 showing the relative alignment of the grille with a car stereo speaker.
Figure 2B:
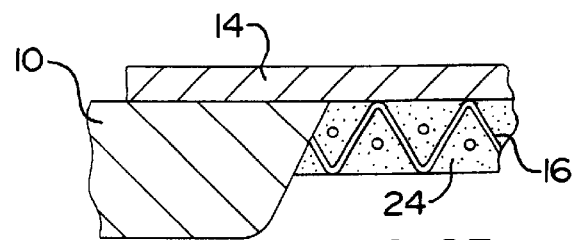
FIG. 2B is an enlarged view of the heat bonded portion of FIG. 2A.

As further seen in FIGS. 1, 2A, and 2B, a screen or mesh 16 is bonded or molded to the panel around the periphery of each aperture 12. Screen 16 may be formed from wire screen material, such as thin wire mesh having ½ inch square openings. Of course, other mesh sizes may be used.

The main function of screen 16 is to support the generally limp cover material 14 overlying the apertures 12. This keeps the cover material flat and smooth and provides support for any articles placed on the upper surface of the trim panel 10. As shown in FIG. 2A, speaker 15 is bolted to a metal shelf 19 underlying panel 10 and aligned with each aperture 12.

Although the wire screen 16 may be bonded to the underside of the trim panel 10 with an adhesive such as a hot melt glue as shown in FIG. 5, it has been found preferable to insert mold the wire screen 16 directly into the trim panel. As seen in FIG. 3, two sheets of trim panel material 18 are aligned with one another such that apertures 12 are superimposed one over the other.

A wire screen 16 is aligned between each pair of superimposed apertures 12 and placed in a hot mold press 20 as shown in FIG. 4. The panel material 18 is preferably formed of a fibrous material known as "shoddy" which is produced from shredded cloth rags. The shoddy is preferably impregnated with heat-activated adhesive or glue, which when heated in a mold or the like, bonds to itself and other objects. Such bonding also adds rigidity to the shoddy.

When the hot mold press 20 of FIG. 4 compresses and heats the two layers of shoddy material 18, the wire screens 16 are encapsulated and sandwiched between the layers. The adhesive within the shoddy material securely and permanently bonds the screens 16 to the trim panel 10. The adhesive also bonds the two layers of shoddy material to one another along bond line 22 and rigidifies the resulting laminated panel assembly.

It should be noted that it is possible to eliminate the upper layer of shoddy material in FIG. 3 and simply press and bond the screens 16 into the single bottom layer of shoddy material 18 in the same manner as shown in FIG. 4. In general, two layers of shoddy are preferred to provide increased sound isolation to the vehicle cabin and increased strength and rigidity to the trim panel 10.

The pressure applied by the mold press 20 should be sufficient to extrude the shoddy material 18 around the edges of the wire mesh 16 where the shoddy material and wire mesh overlap so that the closed height of mold press 20 over and adjacent to screens 16 is about equal to the diameter of the metal wire rods forming the wire screens 16. Thus, the finished molded panel 10 has a reduced thickness about equal to the diameter of the wires in the wire screens around the peripheral area 24 surrounding each aperture 12.

As noted above, a bead of adhesive 26, as shown in FIG. 5, may be used to bond each screen 16 to the underside of panel 10 around the border 24 of each aperture 12. Alternatively, adhesive tape or other fasteners such as staples may be used to secure the screens directly to the panel 10.

A comparison of the open substantially unobstructed speaker grille provided in the panel of FIG. 5 with the acoustically obstructed prior art panel of FIG. 6 emphasizes the improvement in speaker sound quality achievable with the present invention. In the grille of FIG. 6, a pattern of holes or perforations is formed directly through the shoddy panel material per se such that the sound absorbing shoddy panel material remaining between the perforations absorbs and distorts the speaker sound. A particular drawback to this prior art approach is the sound distortion produced by loose threads 30 projecting into the perforations from the surrounding shoddy material. The present invention obviates such loose threads.

It should be understood that while this invention has been discussed in connection with one particular example, those skilled in the art will appreciate that other modifications can be made without departing from the spirit of this invention after studying the specification, drawings, and the following claims.

What is claimed is:

1. A vehicle trim panel, comprising:

a sheet of fibrous panel material having a substantially planar portion, a speaker aperture formed in said planar portion and a compressed peripheral area surrounding said aperture formed of a compressed portion of said panel material; and a screen compressed within said peripheral area and bonded to said panel material and extending over said aperture.

2. The panel of claim 1, further comprising a sheet of cover material applied over said panel material.

3. The panel of claim 1, wherein said screen is molded to said panel material.

4. The panel of claim 1, wherein said sheet of panel material comprises a first layer and a second layer and wherein said screen is bonded between said first and second layers.

5. The panel of claim 1, wherein said panel material comprises a compressed portion having a reduced thickness surrounding said aperture.

6. The panel of claim 5, wherein said screen comprises a predetermined thickness substantially the same as said reduced thickness of said compressed portion.

7. The panel of claim 1, wherein said screen is pressed into said panel material.

8. The panel of claim 1, wherein said panel material comprises a fibrous material impregnated with a heat-activated adhesive.

9. The assembly of claim 1, wherein said screen is insert molded into said panel material.

10. A vehicle trim panel, comprising:

a sheet of fibrous panel material having a substantially planar portion and a speaker aperture formed in said planar portion, said aperture having a periphery defined by said panel material; and a wire screen insert molded into said periphery and extending over said aperture.

11. The panel of claim 10, wherein said wire screen comprises a metal wire screen having square openings.

12. The panel of claim 10, wherein said panel material comprises a shoddy material impregnated with a heat-activated adhesive.

\* \* \* \* \*